United States Patent
You et al.

(10) Patent No.: US 9,134,575 B2
(45) Date of Patent: Sep. 15, 2015

(54) LIQUID CRYSTAL LENS, OPERATION METHOD THEREOF AND PHOTOELECTRIC DEVICE

(75) Inventors: Jaegeon You, Beijing (CN); Juan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 293 days.

(21) Appl. No.: 13/465,133

(22) Filed: May 7, 2012

(65) Prior Publication Data

US 2012/0300167 A1 Nov. 29, 2012

(30) Foreign Application Priority Data

May 23, 2011 (CN) .......................... 2011 1 0134875

(51) Int. Cl.
- G02F 1/13 (2006.01)
- G02F 1/1343 (2006.01)
- G02F 1/29 (2006.01)
- G02B 3/14 (2006.01)
- G02B 27/64 (2006.01)

(52) U.S. Cl.
CPC ............ *G02F 1/134309* (2013.01); *G02B 3/14* (2013.01); *G02B 27/64* (2013.01); *G02F 1/29* (2013.01); *G02F 2001/294* (2013.01); *G02F 2203/28* (2013.01)

(58) Field of Classification Search
CPC ................ G02F 1/134309; G02F 1/29; G02F 2001/294; G02F 2203/28; G02B 3/14; G02B 27/64
USPC .......................................................... 349/200
See application file for complete search history.

(56) References Cited

U.S. PATENT DOCUMENTS

| | | | |
|---|---|---|---|
| 2007/0139333 A1* | 6/2007 | Sato et al. | 345/90 |
| 2007/0296911 A1 | 12/2007 | Hong | |
| 2011/0141341 A1* | 6/2011 | Lin et al. | 348/345 |

FOREIGN PATENT DOCUMENTS

| | | |
|---|---|---|
| CN | 101097308 A | 1/2008 |
| CN | 101760724 A | 6/2010 |
| CN | 101985517 A | 3/2011 |
| JP | 11-109304 A | 4/1999 |

OTHER PUBLICATIONS

Mae YE, et al; "Liquid crystal lens with focus movable in focal plane", Optics Communications, vol. 259, pp. 710-722, Mar. 15, 2006.
Search Report CN2011101348757; dated May 23, 2011.
First Chinese Office Action dated Oct. 29, 2013; Appln. No. 201110134875.7.

(Continued)

*Primary Examiner* — Paisley L Arendt
(74) *Attorney, Agent, or Firm* — Ladas & Parry LLP

(57) ABSTRACT

A liquid crystal lens, a manufacturing method thereof, an operation method thereof and a photoelectric device are provided. The lens comprises: a first electrode layer; a first transparent substrate; a second transparent substrate, provided to a lower surface of the first electrode layer and opposite to the first transparent substrate; a second electrode layer, provided to an upper surface of the first transparent substrate and comprising a first sub-electrode-layer and a second sub-electrode-layer which are separated from each other; and a liquid crystal layer provided between the second transparent substrate and the second electrode layer.

11 Claims, 3 Drawing Sheets

(56) References Cited

OTHER PUBLICATIONS

Second Chinese Office Action dated May 19, 2014; Appln. No. 201110134875.7.

Fourth Chinese Office Action dated Feb. 11, 2015, Appln. No. 201110134875.7.
Third Chinese Office Action Appln. No. 2001110134875.7; Dated Nov. 4, 2014.

* cited by examiner

LIQUID CRYSTAL LENS, OPERATION METHOD THEREOF AND PHOTOELECTRIC DEVICE

BACKGROUND

Embodiments of the disclosed technology relate to a liquid crystal lens, a manufacturing method of a liquid crystal lens, an operation method of a liquid crystal lens, and a photoelectric device.

Liquid crystal materials have electrical anisotropy and optical anisotropy properties, and the optical properties have electrical controllability. Therefore, the liquid crystal materials are often used to manufacture photoelectric devices.

Liquid crystal lens has many different configurations, such as liquid crystal having a variable focal length of a stack structure of liquid crystal layers, a dual-voltage-driven structure, or a three-electrode-based structure. The lens having variable focal length of a three-electrode-based structure comprises: an upper ITO (indium tin oxide) electrode, a lower ITO electrode, a middle aluminum (Al) electrode, and a liquid crystal layer provided between the upper ITO electrode and the middle Al electrode. The middle Al electrode comprises four sub-electrodes which have a same size. When the voltages respectively applied to the four sub-electrodes are equal to each other, a same phase shift occurs in the liquid crystal layer. In this case, the liquid crystal lens of a symmetrical type can be obtained, and the focus of the liquid crystal lens is located at the central axis of the Al electrode. When the voltages respectively applied to the four sub-electrodes are totally or partially different from each other, different phase shifts occur in the regions of the liquid crystal layer respectively corresponding to the four sub-electrodes. In this case, the liquid crystal lens deforms and becomes asymmetrical and the focus of incident light passing through the asymmetrical liquid crystal lens may be located at an upper side, a lower side, a right side or a left side of the central axis of the middle Al electrode; that is, deviation of the focus occurs in the lateral direction or longitudinal direction.

Therefore, the focus of the liquid crystal lens can be controlled to move in a same plane by controlling the voltages respectively applied to the four sub-electrodes. In addition, the voltage applied to the ITO electrode has a direct influence on the focal length of the liquid crystal lens, and the focal length can be adjusted by controlling the voltage on the ITO electrode.

However, in the case that the middle Al electrode is foliated of four sub-electrodes, more driven circuits are required, the structure of the liquid crystal lens becomes more complicated, and interference among electric fields becomes more significant.

SUMMARY

According to embodiments of the disclosed technology, a liquid crystal lens, a manufacturing method and an operation method of a liquid crystal lens, and a photoelectric device are provided.

According to an embodiment of the disclosed technology, a liquid crystal lens is provided. The lens comprises: a first electrode layer; a first transparent substrate; a second transparent substrate provided to a lower surface of the first electrode layer and opposite to the first transparent substrate; a second electrode layer provided to an upper surface of the first transparent substrate and comprising a first sub-electrode-layer and a second sub-electrode-layer which are separated from each other; and a liquid crystal layer provided between the second transparent substrate and the second electrode layer.

According to another embodiment of the disclosed technology, a photoelectric device is provided. The photoelectric device comprises the above-described liquid crystal lens.

According to still another embodiment of the disclosed technology, a manufacturing method of a liquid crystal lens is provided. The method comprises: providing a second transparent substrate to a lower surface of a first electrode layer; providing a second electrode layer on an upper surface of a first transparent substrate, wherein the first and second transparent substrate are opposite to each other, the second electrode layer comprises a first sub-electrode-layer and a second sub-electrode-layer separated from each other; and filling a liquid crystal layer between the second transparent substrate and the second electrode layer.

In one embodiment of the disclosed technology, the focus of the liquid crystal lens can be determined by adjusting the voltages respectively applied to the first sub-electrode-layer and the second sub-electrode-layer. In this way, the refractive indexes in respective regions of the liquid crystal layer can become non-uniform, the retardations of the light when passing through the respective regions of the liquid crystal layer can correspondingly become non-uniform, and thus a larger projection range can be obtained on the screen by using a smaller lens. In addition, in one embodiment of the disclosed technology, the number of the driven circuits can be reduced, the structure of the liquid crystal lens can be simplified, and the interference among electric fields can be weakened as described above.

BRIEF DESCRIPTION OF THE DRAWINGS

The disclosed technology will become more fully understood from the detailed description given hereinafter and the accompanying drawings which are given by way of illustration only, and thus are not limitative of the disclosed technology and wherein.

DESCRIPTION OF THE EMBODIMENTS

Hereinafter, one or more embodiments of the disclosed technology will be described in detail with reference to the accompanying drawings so that the objects, technical solutions and advantages of the embodiments of the disclosed technology will become more apparent. It should be noted that the embodiments described below merely are a portion of but not all of the embodiments of the disclosed technology, and thus various modifications, combinations and alterations may be made on basis of the described embodiments without departing from the spirit and scope of the disclosed technology.

Figure 1:
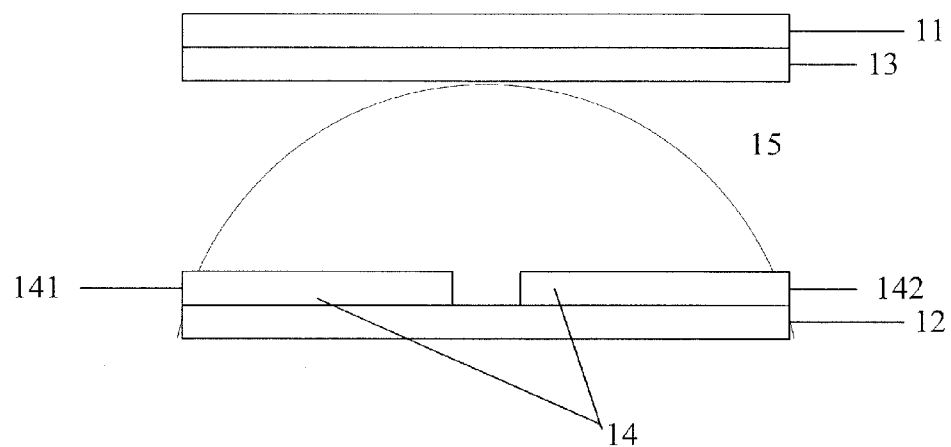
FIG. 1 is a schematic view showing a liquid crystal lens according an embodiment of the disclosed technology.

According to an embodiment of the disclosed technology, a liquid crystal lens is provided. As shown in FIG. 1, the liquid crystal lens comprises: a first electrode layer 11 and a first transparent substrate 12; a second transparent substrate 13 provided on the lower surface of the first electrode layer 11 and opposite to the first transparent substrate 12; a second electrode layer 14, provided on an upper surface of the first transparent substrate 12 and comprising a first sub-electrode-layer 141 and a second sub-electrode-layer 142, which are separated from each other; and a liquid crystal layer 15 provided between the second transparent substrate 13 and the second electrode layer 14.

Figure 2:
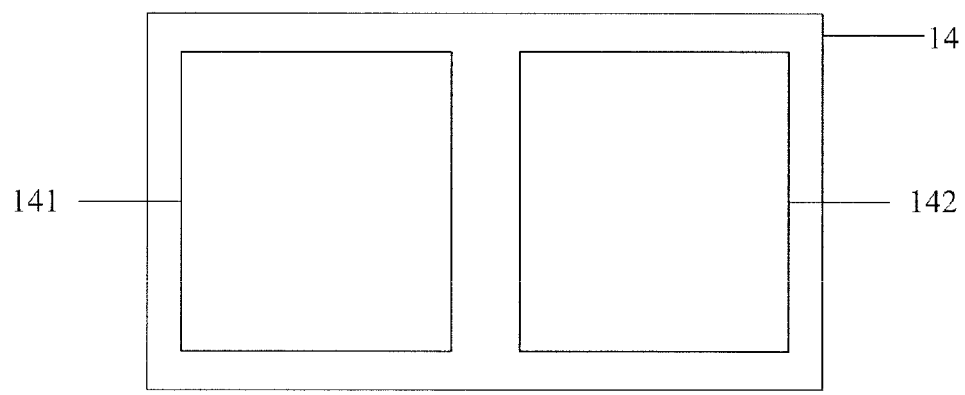
FIG. 2 is a structural view showing a second electrode layer in the embodiment of the disclosed technology.

For example, the first transparent substrate 12 and the second transparent substrate 13 each may be made of glass, plastic or the like transparent material. The first electrode layer 11 is a common electrode layer. When voltages are applied to the first electrode layer 11 and the second electrode layer 14, an electric field are generated between these electrodes. FIG. 2 is a structural view showing the second electrode layer 14 in the embodiment of the disclosed technology. The second electrode layer 14 is made of an impedance material. For example, the second electrode layer 14 is made of a material having high conductivity and high transmissivity. Preferably, the second electrode layer 14 is made of graphene or a composite material of graphene and conductive polymer. The first sub-electrode-layer 141 and the second sub-electrode-layer 142 may be made of a same material or different materials. In addition, the first sub-electrode-layer 141 and the second sub-electrode-layer 142 may have any suitable shapes, and the sizes thereof may be equal to or different from each other. Preferably, the first sub-electrode-layer 141 and the second sub-electrode layer 142 have a same shape and a same size. As shown in FIG. 2, both the first sub-electrode-layer 141 and the second sub-electrode layer 142 have a rectangular shape of a same size.

By respectively adjusting the voltages applied to the first sub-electrode-layer 141 and the second sub-electrode-layer 142, the electric field between the first electrode layer 11 and both the first sub-electrode-layer 141 and the second sub-electrode layer 142 can be changed or modified. Due to such change of the electric field, the movement of the focus of the liquid crystal lens of the liquid crystal layer 15 can be adjusted. Therefore, different projection result can be obtained by changing the location of the focus of the liquid crystal lens.

Preferably, the liquid crystal lens further comprises a first driven circuit connected with the first sub-electrode-layer 141 and a second driven circuit connected with the second sub-electrode-layer 142. The number of the driven circuits corresponds to the number of the sub-electrode-layers of the second electrode layer. In this embodiment, since less driven circuits are required, the number of the circuits required by the liquid crystal lens can be reduced and the structure of the liquid crystal lens can be simplified. In addition, the interference between the electric fields of the first sub-electrode-layer 141 and that of the second sub-electrode-layer 142 can be weakened.

The above-described liquid crystal lens may be applied to many photoelectric devices such as a projector. The focus of the liquid crystal lens according to the embodiment of the disclosed technology can be moved in the lateral direction as described above, thus the projector comprising a liquid crystal lens according to the embodiment of the disclosed technology can obtain same projection result as that of the projector comprising a conventional liquid crystal lens. At the same time, since the volume of the liquid crystal lens according the embodiment of the disclosed technology is smaller than that of the conventional liquid crystal lens, the volume of the photoelectric device (such as projector) comprising the liquid crystal lens according to the embodiment of the disclosed technology can be reduced and such photoelectric device can become more light and portable.

Figure 3:
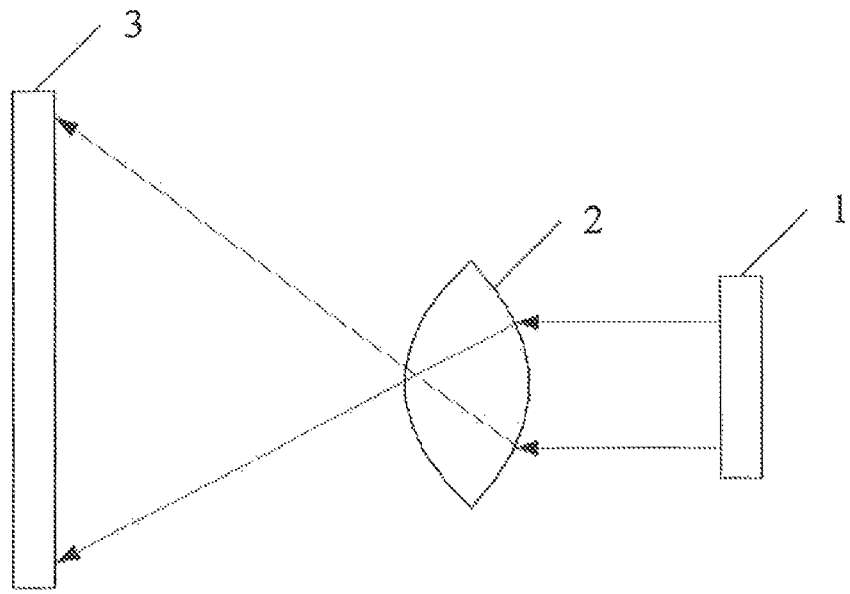
FIG. 3 is a schematic view showing the operation principle of a conventional projector.
Figure 4:
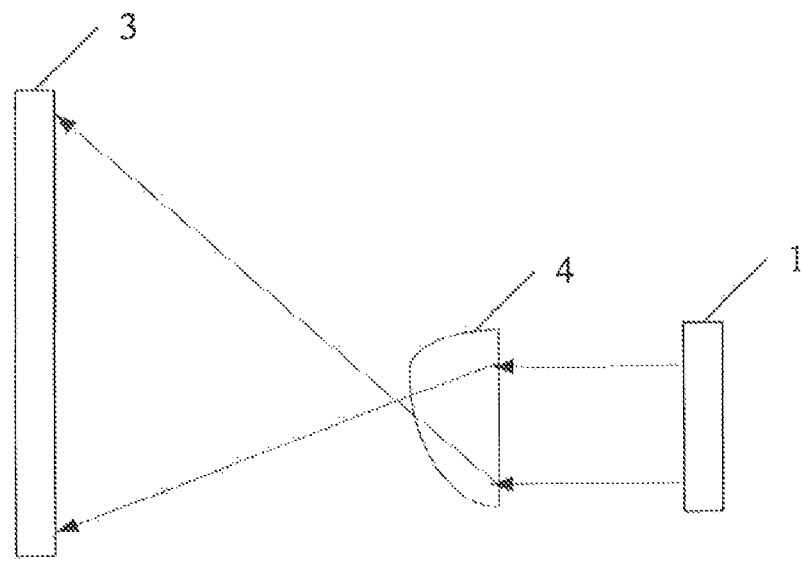
FIG. 4 is a schematic view showing the operation principle of a projector using the liquid crystal lens according to the embodiment of the disclosed technology.

FIG. 3 is a schematic view showing the operation principle of a conventional projector. As shown in FIG. 3, the light from the light source 1 passes through the conventional lens 2 and is projected on the screen 3. FIG. 4 is a schematic view showing the operation principle of the projector using the liquid crystal lens according to the embodiment of the disclosed technology. As shown in FIG. 4, same projection result can be obtained on the screen 3 but the volume of the liquid crystal lens 4 can be significantly smaller than that of the conventional lens 2.

Figure 5:
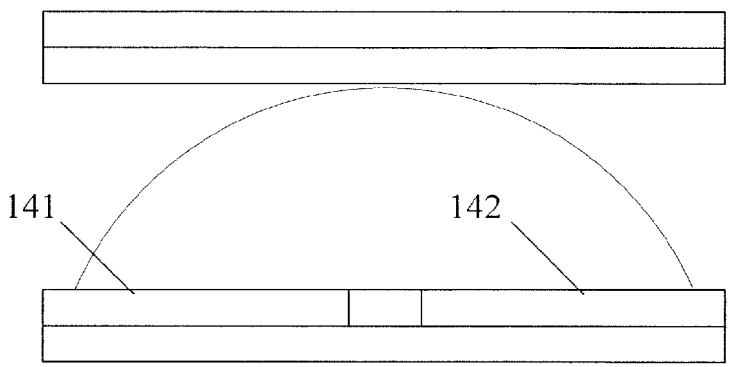
FIG. 5-7 are schematic views showing the shape of the liquid crystal lens when the voltages on a first sub-electrode-layer and a second sub-electrode-layer are changed according to the embodiment of the disclosed technology.

According to another embodiment of the disclosed technology, a manufacturing method of the above liquid crystal lens is further provided. As shown in FIG. 5, the method comprises the following steps.

Step 501 of adhering a second transparent substrate to a lower surface of a first electrode layer;

Step 502 of providing a second electrode layer on an upper surface of a first transparent substrate, wherein the second electrode layer comprises a first sub-electrode-layer and a second sub-electrode-layer separated from each other; and Step 503 of filling a liquid crystal layer between the second transparent substrate and the second electrode layer.

For example, the first electrode layer is a common electrode layer. An electric field is formed between the first electrode layer and the second electrode layer. For example, the voltage on the first electrode layer can be kept constant, and the movement distance of the focus in the lateral direction is controlled by changing the voltages respectively applied to the first sub-electrode-layer and the second sub-electrode-layer.

As shown in FIG. 5, the liquid crystal lens operates as a symmetrical convex lens and the focus is located on the symmetrical axis when the voltage applied to the first sub-electrode-layer 141 is equal to that applied to the second sub-electrode-layer 142.

Figure 6:
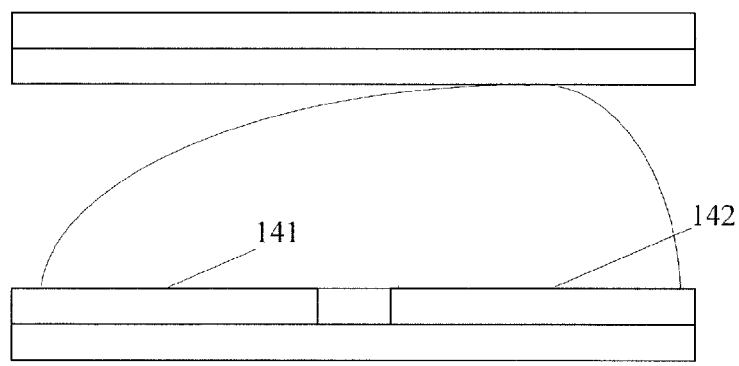

As shown in FIG. 6, the focus of the liquid crystal lens deviates towards the region corresponding to the second sub-electrode-layer 142 when the voltage applied to the first sub-electrode-layer 141 is larger than that applied to the second sub-electrode-layer 142.

Figure 7:
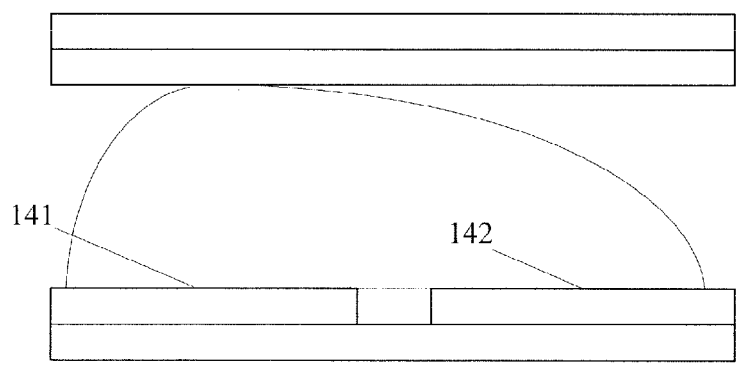

As shown in FIG. 7, the focus of the liquid crystal lens deviates towards the region corresponding to the first sub-electrode-layer 141 when the voltage applied to the first sub-electrode-layer 141 is smaller than that applied to the second sub-electrode-layer 142.

Preferably, the first sub-electrode-layer is connected to a first driven circuit, and the second sub-electrode-layer is connected to a second driven circuit. The number of the driven circuits corresponds to the number of the sub-electrode-layers comprised in the second electrode layer. According to this embodiment, since less driven circuits are required, the number of the circuits required by the liquid crystal lens can be reduced and the structure of the liquid crystal lens can be simplified. In addition, the interference between the electric field of the first sub-electrode-layer 141 and that of the second sub-electrode-layer 142 can be weakened.

According to the manufacturing method of the liquid crystal lens in this embodiment, the focus of the liquid crystal lens can be determined by adjusting the voltages respectively applied to the first sub-electrode-layer and the second sub-electrode-layer. In this way, the refractive indexes in respective regions of the liquid crystal layer can become non-uniform, the retardations of the light passing through the respective regions of the liquid crystal layer can correspondingly become non-uniform, and thus a larger projection range can be obtained on the screen by using a smaller lens. In addition, in this embodiment, the number of the driven circuits can be reduced, the structure of the liquid crystal lens can be simplified, and the interference among electric fields can be weakened as described above.

According to still another embodiment of the disclosed technology, an operation method of the above liquid crystal lens is further provided. The method comprises the following steps.

Step 901 of presetting a voltage applied to a first electrode layer; and

Step 902 of determining a focus of a liquid crystal layer filled between a second transparent substrate under the first electrode layer and a second electrode layer by adjusting voltages respectively applied to a first sub-electrode-layer and a second sub-electrode-layer of the second electrode layer. The first sub-electrode-layer and the second sub-electrode-layer are separated from each other, and the second transparent substrate is provided on the lower surface of the first electrode layer.

For example, the first electrode layer is a common electrode layer. The second transparent substrate is provided on the lower surface of the first electrode layer, for example. The second electrode layer is provided on the upper surface of the first transparent substrate. The second electrode layer comprises the first sub-electrode-layer and the second sub-electrode-layer that are separated from each other. The first sub-electrode-layer is connected to a first driven circuit, and the second sub-electrode-layer is connected to a second driven circuit. The focus of the liquid crystal lens can be determined by adjusting the voltages respectively applied to the first sub-electrode-layer and the second sub-electrode-layer. For example, the liquid crystal lens operates as a symmetrical convex lens and the focus is located on the symmetrical axis when the voltage applied to the first sub-electrode-layer is equal to that applied to the second sub-electrode-layer; the focus of the liquid crystal lens deviates towards the region corresponding to the second sub-electrode-layer when the voltage applied to the first sub-electrode-layer is larger than that applied to the second sub-electrode-layer; the focus of the liquid crystal lens deviates towards the region corresponding to the first sub-electrode-layer when the voltage applied to the first sub-electrode-layer is smaller than that applied to the second sub-electrode-layer.

According to the liquid crystal lens, the manufacture and operation methods thereof and the photoelectric device according to the embodiments of the disclosed technology, the focus of the liquid crystal lens can be determined by adjusting the voltages respectively applied to the first sub-electrode-layer and the second sub-electrode-layer. In this way, the refractive indexes in respective regions of the liquid crystal layer can become non-uniform, the retardations of the light when passing through the respective regions of the liquid crystal layer can correspondingly become non-uniform, and thus a larger projection range can be obtained on the screen by using a smaller lens. In addition, the number of the driven circuits can be reduced, the structure of the liquid crystal lens can be simplified, and the interference among electric fields can be decreased.

It should be noted that the embodiments of the disclosed technology can be provided in forms of methods, systems or computer programs. Therefore, the embodiments of the disclosed technology may be implemented in hard-wares, soft-wares or combination of hard-wares and soft-wares. In addition, the embodiments of the disclosed technology may be implemented in the form of computer programs stored in storage medium and executed on a computing device such as central processing unit (CPU), digital signal processor (DSP), and the like.

It should be appreciated that the embodiments described above are intended to illustrate but not limit the disclosed technology. Although the disclosed technology has been described in detail herein with reference to the preferred embodiments, it should be understood by those skilled in the art that the disclosed technology can be modified and some of the technical features can be equivalently substituted without departing from the spirit and scope of the disclosed technology.

What is claimed is:

1. A liquid crystal lens comprising:
   a first electrode layer;
   a first transparent substrate;
   a second transparent substrate provided to a lower surface of the first electrode layer and opposite to the first transparent substrate;
   a second electrode layer provided to an upper surface of the first transparent substrate and comprising a first sub-electrode-layer and a second sub-electrode-layer which are separated from each other; and
   a liquid crystal layer provided between the second transparent substrate and the second electrode layer, and
   wherein an electrode structure of the liquid crystal lens only comprises the first electrode layer which is provided on a side of the second transport substrate opposite to the liquid crystal layer and directly contacts the second transparent substrate, and the first sub-electrode and the second sub-electrode layer which are provided on a side of the first transparent substrate facing the liquid crystal layer and directly contact the liquid crystal layer and the first transparent substrate;
   wherein the liquid crystal lens operates as a symmetrical convex lens and a focus thereof is located on a symmetrical axis when a voltage applied to the first sub-electrode-layer is equal to that applied to the second sub-electrode-layer; and
   wherein the focus of the liquid crystal lens deviates from the symmetrical axis when the voltage applied to the first sub-electrode-layer is not equal to that applied to the second sub-electrode-layer.

2. The liquid crystal lens according to claim 1, wherein the first sub-electrode-layer and the second sub-electrode-layer are made of graphene or a composite of graphene and conductive polymers.

3. The liquid crystal lens according to claim 2, wherein the first electrode layer is a common electrode layer.

4. The liquid crystal lens according to claim 1, wherein the liquid crystal lens further comprises:
   a first drive circuit connected to the first sub-electrode-layer; and
   a second drive circuit connected to the second sub-electrode-layer.

5. The liquid crystal lens according to claim 1, wherein the first transparent substrate and the second transparent substrate are glass substrates.

6. The liquid crystal lens according to claim 1, wherein the first sub-electrode-layer and the second sub-electrode-layer can be independently applied with the voltages to adjust the focus of the liquid crystal lens.

7. A photoelectric device, comprising the liquid crystal lens according to claim 1.

8. The photoelectric device according to claim 7, wherein the photoelectric device is a projector.

9. An operation method of the liquid crystal lens according to claim 1, comprising:
presetting a voltage applied to the first electrode layer; and
determining the focus of the liquid crystal lens comprising the liquid crystal layer filled between the second transparent substrate and the second electrode layer by adjusting the voltages respectively applied to the first sub-electrode-layer and the second sub-electrode layer.

10. The operation method according to claim 9, wherein
the focus of the liquid crystal lens deviates towards a region corresponding to the second sub-electrode-layer when the voltage applied to the first sub-electrode-layer is larger than that applied to the second sub-electrode-layer; and
the focus of the liquid crystal lens deviates towards a region corresponding to the first sub-electrode-layer when the voltage applied to the first sub-electrode-layer is smaller than that applied to the second sub-electrode-layer.

11. The operation method according to claim 9, wherein the voltage applied to the first sub-electrode-layer is controlled by a first drive circuit, and the voltage applied to the second sub-electrode-layer is controlled by a second drive circuit.

* * * * *

UNITED STATES PATENT AND TRADEMARK OFFICE
CERTIFICATE OF CORRECTION

PATENT NO.       : 9,134,575 B2                                    Page 1 of 1
APPLICATION NO.  : 13/465133
DATED            : September 15, 2015
INVENTOR(S)      : You et al.

It is certified that error appears in the above-identified patent and that said Letters Patent is hereby corrected as shown below:

In the claims

Claim 1, column 6, line 31, delete "transport" and insert --transparent--.

Signed and Sealed this
Fifth Day of April, 2016

Michelle K. Lee
*Director of the United States Patent and Trademark Office*